(12) United States Patent
Matsuzaki

(10) Patent No.: US 9,978,050 B2
(45) Date of Patent: May 22, 2018

(54) OBJECT RECOGNIZING APPARATUS, METHOD OF INDICATING A RECOGNITION RESULT, AND COMPUTER READABLE RECORDING MEDIUM

(71) Applicant: CASIO COMPUTER CO., LTD., Shibuya-ku, Tokyo (JP)

(72) Inventor: Kenichiro Matsuzaki, Tokorozawa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 37 days.

(21) Appl. No.: 15/055,716

(22) Filed: Feb. 29, 2016

(65) Prior Publication Data
US 2016/0275363 A1  Sep. 22, 2016

(30) Foreign Application Priority Data
Mar. 16, 2015  (JP) .................................. 2015-052431

(51) Int. Cl.
 *G06K 9/00* (2006.01)
 *G06Q 20/20* (2012.01)
 *G07G 1/00* (2006.01)

(52) U.S. Cl.
 CPC ......... *G06Q 20/208* (2013.01); *G07G 1/0063* (2013.01); *G06K 2209/17* (2013.01)

(58) Field of Classification Search
 CPC ........................... G06Q 20/208; G07G 1/0063
 See application file for complete search history.

(56) References Cited

U.S. PATENT DOCUMENTS

| | | | | |
|---|---|---|---|---|
| 2010/0158310 | A1* | 6/2010 | McQueen | G06K 9/00 382/100 |
| 2011/0147454 | A1* | 6/2011 | Matsuhisa | G06K 7/10861 235/383 |
| 2013/0054397 | A1 | 2/2013 | Nakatake et al. | |
| 2015/0139493 | A1* | 5/2015 | Takeno | G06K 9/00912 382/103 |

FOREIGN PATENT DOCUMENTS

| | | |
|---|---|---|
| JP | 2004240835 A | 8/2004 |
| JP | 2011170745 A | 9/2011 |
| JP | 2013050924 A | 3/2013 |

OTHER PUBLICATIONS

Japanese Office Action (and English translation thereof) dated May 9, 2017 issued in counterpart Japanese Application No. 2015-052431.

* cited by examiner

*Primary Examiner* — Oneal R Mistry
(74) *Attorney, Agent, or Firm* — Holtz, Holtz & Volek PC

(57) ABSTRACT

An object recognizing is provided, which comprises a storing unit for storing feature values of objects in each classification of plural objects, wherein the feature value is used as a reference for specifying an object, an object recognizing unit for photographing an object placed within a prescribed area with a photographing device to specify a placing position of the object from an image of the photographed object, and referring to the feature values stored in the storing unit to recognize the classification of the photographed object, and a recognition result indicating unit for making a light emitting device emit light toward the specified placing position of the object to indicate whether or not the object recognizing unit has recognized the classification of the object photographed by the photographing device.

9 Claims, 8 Drawing Sheets

FIG.4
| COMMODITY ID | COMMODITY NAME | UNIT PRICE (YEN) | FEATURE VALUE | (REPRESENTATIVE IMAGE) |
|---|---|---|---|---|
| 001 | JAM BUN | 120 | FEATURE VALUE OF JAM BUN |  |
| 002 | CREAM BUN | 100 | FEATURE VALUE OF CREAM BUN | 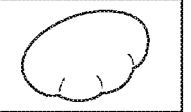 |
| 003 | SWEET BEAN BUN | 100 | FEATURE VALUE OF SWEET BEAN BUN | 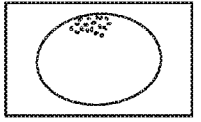 |
| 004 | CURRY BUN | 150 | FEATURE VALUE OF CURRY BUN | 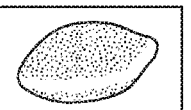 |
| ⋮ | ⋮ | ⋮ | ⋮ | ⋮ |

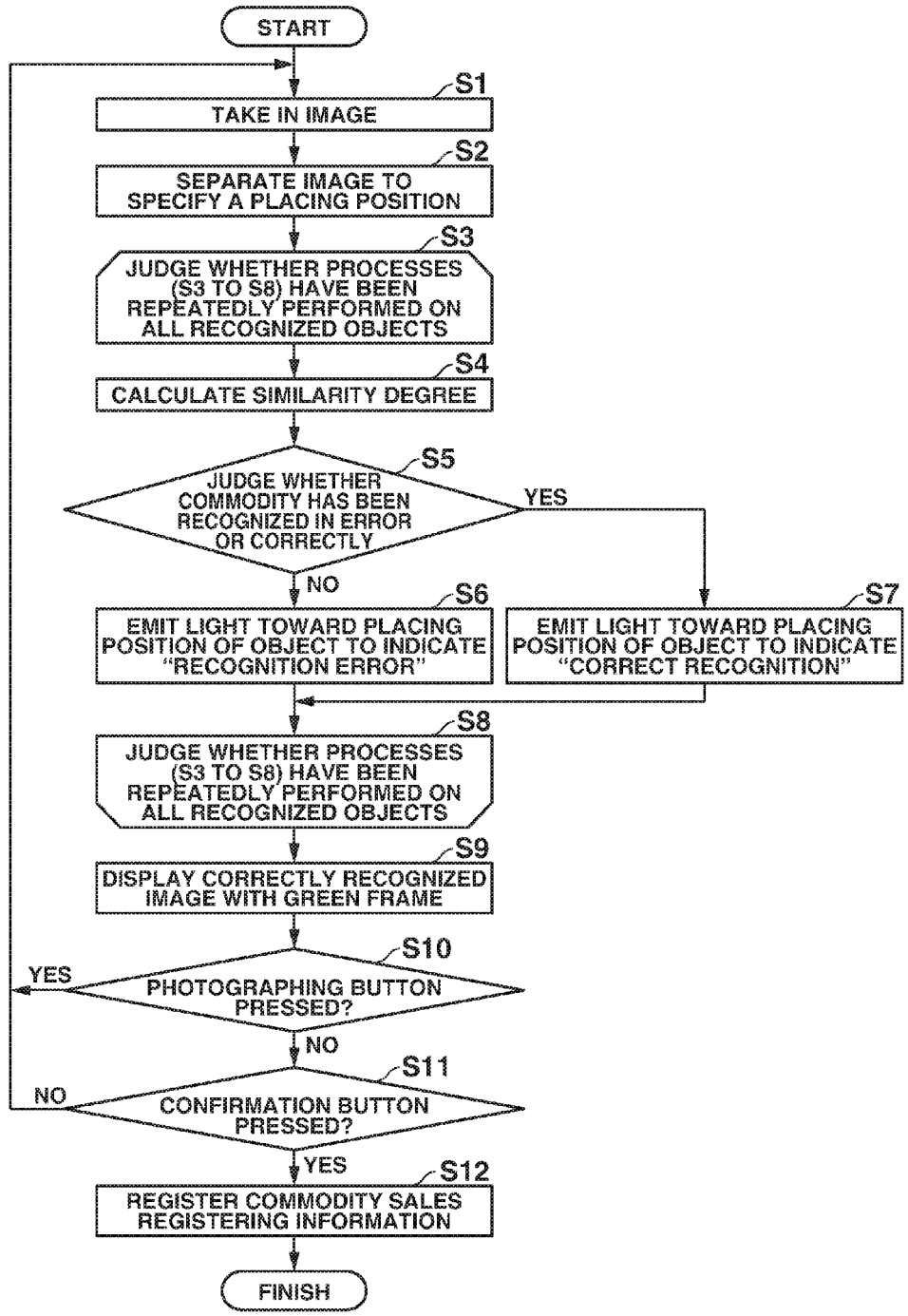

OBJECT RECOGNIZING APPARATUS, METHOD OF INDICATING A RECOGNITION RESULT, AND COMPUTER READABLE RECORDING MEDIUM

CROSS-REFERENCE TO RELATED APPLICATION

The present application is based upon and claims the benefit of priority from the prior Japanese Patent Application No. 2015-052431, filed Mar. 16, 2015, the entire contents of which are incorporated herein by reference.

BACKGROUND OF THE INVENTION

1. Field of the Invention

The present invention relates to an object recognizing apparatus using an object recognizing technology, a method of indicating a recognition result, and a computer readable recording medium.

2. Description of the Related Art

A technology concerning an object recognizing apparatus is known, which technology extracts a feature value of a commodity from image data of a photographed commodity, and compares the extracted feature value with reference data (feature value) prepared previously, thereby recognizing a classification of the commodity. A store system is proposed in Japanese Unexamined Patent Publication No. 2011-170745, which system uses the technology concerning an object recognizing apparatus for recognizing a commodity, such as buns and green vegetables, to register sales of recognized commodities.

For instance, a bun recognizing apparatus is disclosed by Japanese Unexamined Patent Publication No. 2011-170745, which apparatus photographs buns on a tray with a camera, and recognizes the sorts of the buns on the tray and the number of buns based on image information of the photographed buns (image recognition or object recognition), registering commodities.

In the conventional object recognizing apparatus, when plural commodities, for example, such as a commodity "A", a commodity "B", a commodity "B" and a commodity "B", are recognized simultaneously, some of these commodities cannot be recognized for reasons that some commodities lie partially on other. In this case, even though the conventional object recognizing apparatus displays the commodity which has been recognized in error on a displaying screen, it is hard to actually specify which commodity has been recognized in error, because the same sort of plural commodities are placed on the tray. Then, the operator of the object recognizing apparatus is required to compare the commodity recognized in error on the displaying screen with the commodity actually placed on the tray to specify the commodity recognized in error and to replace the specified commodity at other position or change its placing angle, or the operator is required to replace all the commodities seemed to be recognized in error or change their placing angles.

SUMMARY OF THE INVENTION

The present invention provides an object recognizing apparatus which can clearly indicate which commodity has been recognized in error, and enhances working efficiency of a salesclerk (operator of the object recognizing apparatus).

According to one aspect of the invention, there is provided an object recognizing apparatus which comprises a storing unit which stores feature values of objects in each classification of plural objects, wherein the feature value is used as a reference for specifying the classification of an object, an object recognizing unit which photographs an object placed within a prescribed area with a photographing device to specify a placing position where the object is placed from an image of the photographed object, and refers to the feature values stored in the storing unit to recognize the classification of the photographed object, and a recognition result indicating unit which makes a light emitting device emit light toward the specified placing position of the object to indicate whether or not the object recognizing unit has recognized the classification of the object photographed by the photographing device.

According to another aspect of the invention, there is provided a method of indicating a recognition result, which comprises a storing step of storing feature values of objects in each classification of plural objects in a storing unit, wherein the feature value is used as a reference for specifying the classification of an object, an object recognizing step of photographing an object placed within a prescribed area with a photographing device to specify a placing position where the object is placed from an image of the photographed object, and referring to the feature values stored in the storing unit to recognize the classification of the photographed object, and a recognition result indicating step of making a light emitting device emit light toward the specified placing position of the object to indicate whether or not the classification of the object photographed by the photographing device has been recognized at the object recognizing step.

According to other aspect of the invention, there is provided a non-transitory computer-readable recording medium with an executable program stored thereon, a computer being mounted on mounted on an object recognizing apparatus, and the program, when installed on the computer, instructing the computer to execute the following steps: a storing step of storing feature values of objects in each classification of plural objects in a storing unit, wherein the feature value is used as a reference for specifying the classification of an object; an object recognizing step of photographing an object placed within a prescribed area with a photographing device to specify a placing position where the object is placed from an image of the photographed object, and referring to the stored feature values to recognize the classification of the photographed object; and a recognition result indicating step of making a light emitting device emit light toward the specified placing position of the object to indicate whether or not the classification of the object photographed by the photographing device has been recognized at the object recognizing step.

BRIEF DESCRIPTION OF THE DRAWINGS

FIG. 4 is a view showing an example of a data configuration of commodity master information according to the embodiments of the invention.

FIG. 8 is a flow chart of a commodity registering process (including the object recognition) performed by the commodity registering apparatus according to the embodiments of the invention.

DETAILED DESCRIPTION OF THE PREFERRED EMBODIMENTS

A commodity registering apparatus and a method of indicating a recognition result according to the embodiments of the present invention will be described with reference to the accompanying drawings in detail.

The commodity registering apparatus 1 is provided with functions of an object recognizing apparatus and a POS registering terminal, and serves to recognize an object (commodity) and obtains information of a classification of the object (commodity) and the number of commodities, displays the total price of the commodities, and/or registers sales information.

Figure 1:
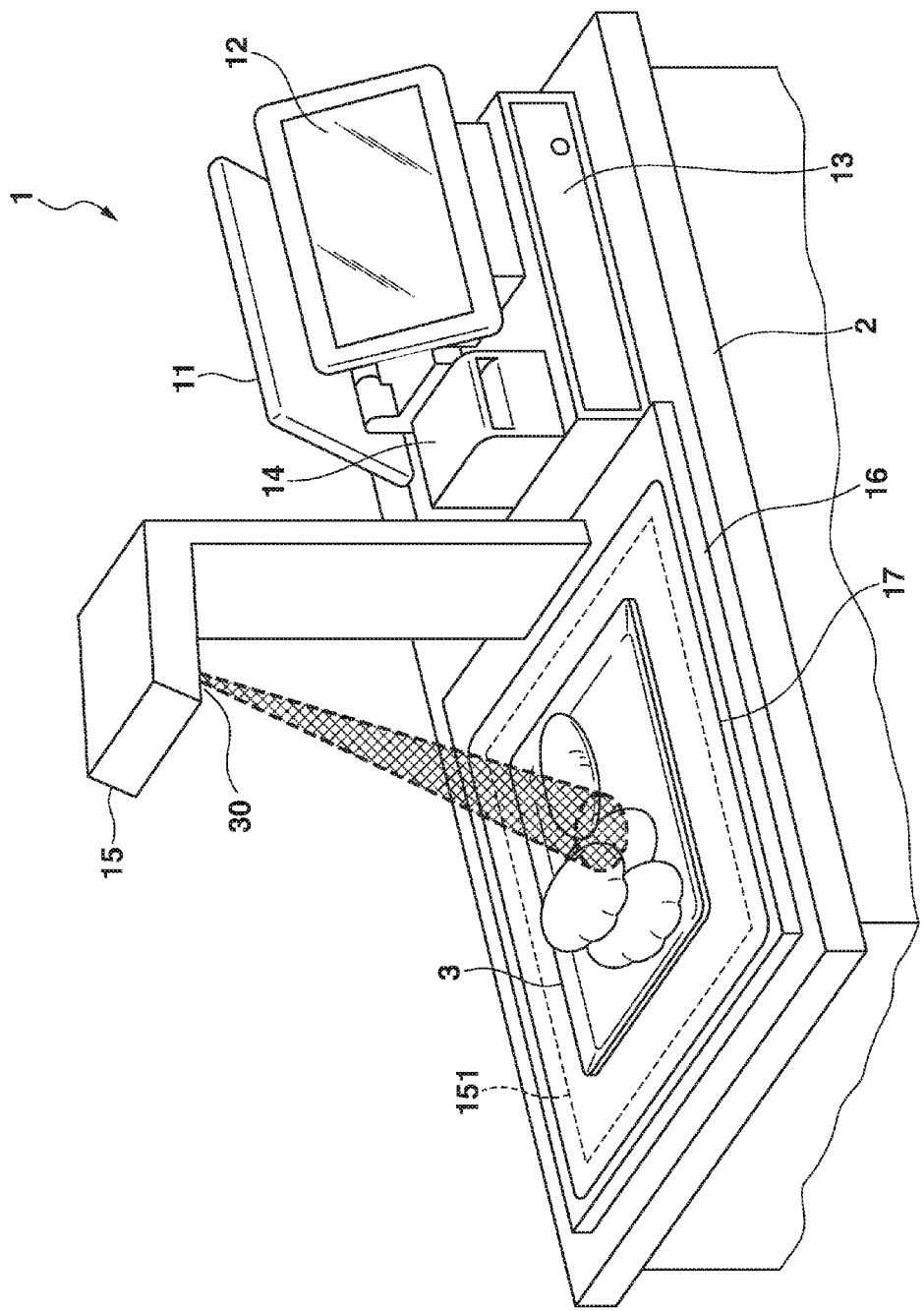
FIG. 1 is a schematic view showing an exterior of a commodity registering apparatus (an object recognizing apparatus) according to the embodiments of the invention.

FIG. 1 is a schematic view showing an exterior of the commodity registering apparatus 1 (object recognizing apparatus) according to the embodiments of the invention. As shown in FIG. 1, the commodity registering apparatus 1 is provided with a displaying device 11 for a customer, a displaying device 12 with a touch screen, a cash drawer 13, a printer 14, a photographing device 15, a photographing support 16, a back light source 17, and a light emitting device (light emitting means) 30. The commodity registering apparatus 1 is set on a counter table 2 in a shop.

The salesclerk (operator of the commodity registering apparatus 1) stands before the counter table 2. When a customer carries out shopping, the customer comes to the counter table 2 and stands on the other side of the counter table 2.

In the commodity registering apparatus 1 according to the embodiment of the invention, an object (commodity) is recognized based on the image information of an object (commodity) photographed by the photographing device 15, and the recognition result is indicated by the light emitting device 30 which emits light toward a placing position specified for an object (commodity) to be recognized.

More specifically, the light emitting device 30 emits visible light to the placing position of the object (commodity) to indicate the recognition result, whereby the salesclerk (operator of the commodity registering apparatus 1) and the customer are allowed to specify an object (commodity) which has been recognized in error. Detail thereof will be described later.

The displaying device 11 for a customer is, for example, a liquid crystal displaying device, and is set to face to the customer. The displaying device 11 fora customer displays information of shopping by the customer such as commodity names and their prices.

The displaying device 12 with a touch screen consists of, for example, a touch screen 12B laminated over the surface of a liquid crystal displaying device 12A (Refer to FIG. 2), and is set to face to the salesclerk (operator). The displaying device 12 with a touch screen displays a photographed image and shopping information (commodity names, prices) and receives inputs by a touch operation of the operator.

The cash drawer 13 serves to store paper money, coins, and notes used in shopping.

The printer 14 is used to print receipts indicating a date, commodities, prices in shopping.

The photographing device 15 is used to photograph commodities (objects, commodities, goods) such as buns on a tray 3 put on the photographing support 16, which commodities are placed within a prescribed area. The photographing device 15 is provided with an illuminating device (not shown), and the illuminating device illuminates the goods placed within a photographing area 151 when they are photographed with the photographing device 15.

The photographing support 16 is used by the customer to put the tray 3 on which the goods are placed to buy. The photographing area 151 defines an area in the photographing support 16 that can be photographed by the photographing device 15.

The back light source 17 is contained within the photographing support 16, and emits back light upwards from beneath the tray 3 such that the commodities (goods) on the tray 3 will be clearly photographed with the photographing device 15. The back light source 17 can be composed of LED (Light Emitting Diodes), but also can be composed of other elements.

The tray 3 is made of a semi-transparent material allowing light to pass through. When commodities (goods) on the tray 3 are photographed with the photographing device 15, the illuminating device illuminates the commodities (goods) and at the same time the backlight source 17 emits back light to the commodities (goods) from beneath the tray 3, whereby the shadows of the commodities (goods) can be minimized.

The light emitting device (light emitting means) 30 emits visible light. A laser projector using laser light to project characters and symbols, a liquid crystal projector and an LED light can be used as the light emitting device (light emitting means) 30. The light emitting device (light emitting means) 30 emits visible light to indicate information including a recognition result ("recognition in error" or "correct recognition") at the position (placing position) of the commodity (good) on the tray 3, photographed by the photographing device 15. The information includes a "symbol" (symbol information) indicating the recognition result.

At sight of the visible light of information emitted from the light emitting device 30, the operator of the commodity registering apparatus 1 and the customer can specify the commodity (good) which has been recognized in error.

Figure 2:
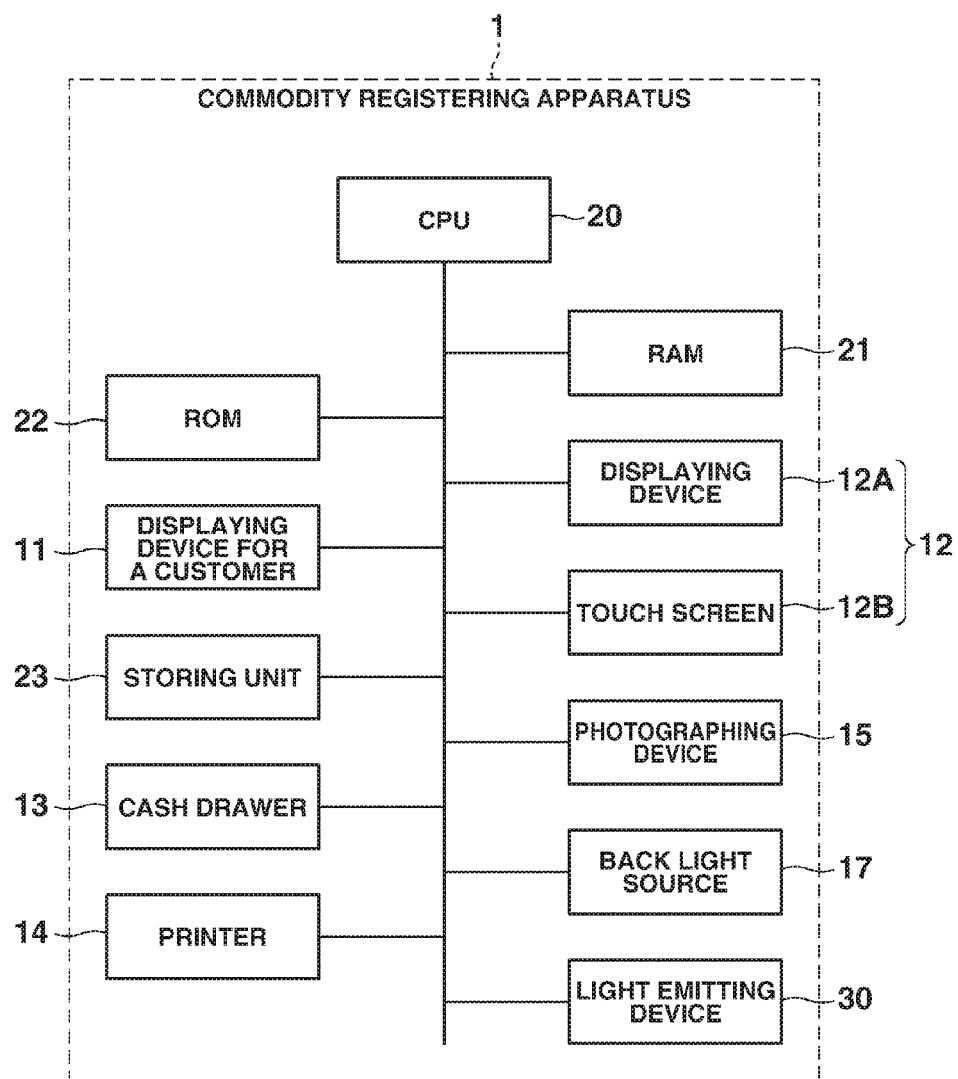
FIG. 2 is a view showing a hardware configuration of the commodity registering apparatus (object recognizing apparatus) according to the embodiments of the invention.

With reference to FIG. 2 and sometimes to FIG. 1, a configuration of the commodity registering apparatus 1 according to the embodiment of the invention will be described. FIG. 2 is a view showing a hardware configuration of the commodity registering apparatus (object recognizing apparatus) 1 according to the embodiment of the invention.

In addition to the elements shown in FIG. 1, the commodity registering apparatus 1 is provided with CPU (Central Processing Unit) 20, RAM (Random Access Memory) 21, ROM (Read Only Memory) 22, and a storing unit 23. These elements are connected to each other through an internal bus (not shown) and/or an input/output circuit (not shown) and are allowed to communicate with each other.

CPU 20 is a central controlling unit and serves to control the whole operation of the commodity registering apparatus 1.

RAM 21 is a temporal storing unit used by CPU 20, and serves to temporally store image data concerning a program to be executed by CPU 20.

ROM 22 is a non-volatile memory and stores the program to be executed by CPU 20.

The displaying device 11 for a customer is controlled by CPU 20 and displays the images of the photographed commodities (goods) and shopping information (commodity names, prices) for the customer.

The displaying device 12A is controlled by CPU 20 and displays the images of the photographed commodities (goods) and shopping information (commodity names, prices) for the operator.

The touch screen 12B receives a touch operation performed by the operator in response to the information displayed on the displaying device 12A.

The storing unit (storing means) 23 consists of, for example, HDD (Hard Disk Drive) and/or SSD (Solid State Drive), and stores various sort of programs and files. The various sort of programs and files stored in the storing unit 23, the whole or a part thereof, are transferred to and memorized in RAM 21 to be executed by CPU 20, when the commodity registering apparatus starts its operation. Further, commodity master information 100 (Refer to FIG. 4) and commodity-sales registration information 200 are stored in the storing unit 23.

The photographing device (photographing means) 15 comprises a color CCD (Charge Coupled Device) image sensor or a color CMOS (Complementary Metal Oxide Semiconductor) image sensor, and is controlled by CPU 20 to execute a photographing operation. The photographing device (photographing means) 15 produces a moving image of a frame rate of 30 fps (frames per second). The frame images produced at a prescribed frame rate by the photographing device 15 are stored in RAM 21.

The back light source 17 is controlled by CPU 20 to emit the back light from beneath to the tray 3 such that the photographing device 15 can photograph the commodities (goods) on the tray 3 more clearly, whereby the shadows casted by the illuminating device provided adjacent to the photographing device 15 will be hided as possible in the photographing area 151, enhancing accuracy in image processing. It is possible for the back light source 17 to emit backlight at all times and also in synchronization with the photographing operation to be executed by the photographing device 15.

The cash drawer 13 is used to store paper money, coins and notes, and is released upon receipt of an instruction from CPU 20.

The printer 14 is, for example, a thermal transfer printer. Upon receipt of an instruction from CPU 20, the printer 14 prints a payment or a receipt indicating a date, commodities, prices in shopping.

The light emitting device (light emitting means) 30 is a device for emitting visible light. The light emitting device 30 has a function of emitting visible light in an arbitrary direction under control of CPU 20. The light emitting device 30 consists of, for example, a projector using laser light, and uses a galvanometer-scanner and/or an optical MEMS (Micro Electro Mechanical Systems) scanner to recognize a commodity (good), and optically indicates the recognition result (result information) at the placing position of the commodity (good). For instance, the light emitting device 30 emits laser light to indicate a mark "X" or "O" to represent whether the commodity (good) has been recognized in error or correctly.

A liquid crystal projector or an LED light device emitting a spotlight can be also used in place of the light emitting device 30. The liquid crystal projector or LED light device applies red visible light toward the commodity to tell the operator of the commodity registering apparatus 1 and the customer that the commodity has been recognized in error.

Figure 3:
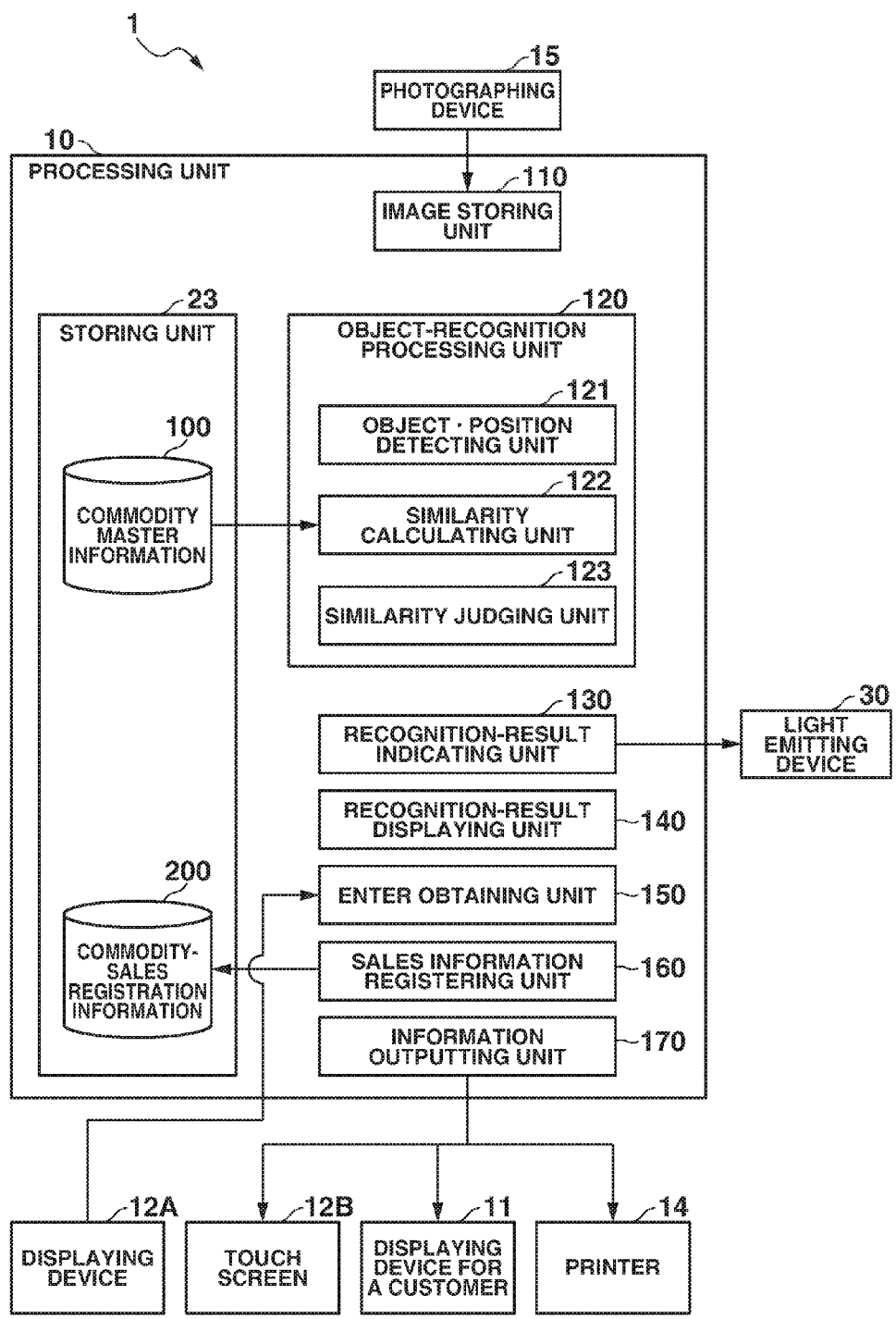
FIG. 3 is a block diagram showing the functions of the commodity registering apparatus (object recognizing apparatus) according to the embodiment of the invention.

With reference to FIG. 3 and sometimes to FIG. 1 and FIG. 2, the functions of the commodity registering apparatus 1 according to the embodiment of the invention will be described. FIG. 3 is a block diagram showing the functions of the commodity registering apparatus (object recognizing apparatus) 1 according to the embodiment of the invention.

CPU 20 of the commodity registering apparatus 1 executes the program stored in ROM 22 to perform functions of a processing unit 10. When the photographing device (photographing means) 15 photographs a commodity (good, trade good) to generate a photographed image, the processing unit 10 recognizes or discriminates a classification of the commodity (good) based on the photographed image (object recognition). Recognizing the commodity (good), the processing unit 10 specifies the placing position where the commodity (good) is placed in the photographing area 151. Further, the processing unit 10 emits light to indicate the specified placing position and makes the light emitting device 30 emit light to represent the recognition result. More specifically, the processing unit 10 makes the light emitting device (light emitting means) 30 apply visible light toward the commodity (good) to indicate the recognition result.

As shown in FIG. 3, the processing unit 10 comprises an image storing unit 110, an object-recognition processing unit (object recognizing means) 120, a recognition-result indicating unit (recognition-result indicating means) 130, a recognition-result displaying unit 140, an enter obtaining unit 150, a sales information registering unit 160, and an information outputting unit 170.

The image storing unit 110 successively takes in the frame image (color digital image) photographed and stored in RAM 21 by the photographing device 15. The frame images are successively taken in by the image storing unit 110 in the order in which said frame images were stored in RAM 21.

The object-recognition processing unit (object recognizing means) 120 uses a so-called "pattern matching technology" to separate the image of the commodity (good) from the background in the frame image taken in by the image storing unit 110, thereby detecting the commodity (good).

More specifically, in the technology of separating the background from the commodity (good), the frame image is binarized, and contour lines (edges) are extracted in the frame image, and an image is separated, which is represented by an area defined based on such contour lines. Hereinafter, sometimes, the image of the commodity (good) separated from the background is referred to as the "object recognized image" or "separated image". The object-recognition processing unit 120 recognizes the commodity (good) on the tray 3 and obtains position information of the commodity (good) from the frame image.

The object-recognition processing unit 120 comprises an object-position detecting unit 121, a similarity calculating unit 122, and a similarity judging unit 123.

The object-position detecting unit 121 extracts contour lines (edges) from the frame image taken in by the image storing unit 110 to separate an image of a candidate commodity, in other words, the object-position detecting unit 121 detects only the image of the commodity (good) to be recognized.

More specifically, when the customer places the tray 3 on the photographing support 16, the photographing device photographs commodities (objects) placed in the photographing area 151 of the photographing support 16. The object-position detecting unit 121 binarizes the frame image taken in by the image storing unit 110 to extract contour lines (edges) from the frame image. Then, the object-position detecting unit 121 separates an area surrounded by the contour lines (edges) to detect a commodity (object). At this time, the object-position detecting unit 121 detect position information of the commodity (object) detected in the photographing area 151, and stores the position information in association with the detected commodity (object) in RAM 21 (Refer to FIG. 2).

The similarity calculating unit 122 calculates a feature value of a surface state of the "object recognized image" ("separated image"), such as shape, size, color, and roughness of the surface of the "object recognized image" ("separated image"). The similarity calculating unit 122 compares the calculated feature value of the "separated image" with a feature value of the commodity (good) contained in the commodity master information 100 (Refer to FIG. 4) stored in the storing in the storing unit 23 (to be described later), thereby calculating a similarity degree of the "object recognized image" ("separated image"). Assuming that the similarity degree of 100% is registered for a commodity (good) in the commodity master information 100, the similarity degree represents how much the "object recognized image" ("separated image") is similar to the commodity (good). When a similarity degree of an "object recognized image" ("separated image") is calculated and the "object recognized image" ("separated image") has plural sorts of feature values, the similarity degree of the commodity (good) is evaluated based on the plural feature values comprehensively and/or the plural feature values weighted respectively.

FIG. 4 is a view showing an example of a data configuration of the commodity master information 100 according to the embodiment of the invention. As shown in FIG. 4, the commodity master information 100 contains commodity IDs, commodity names, prices (Yen), and feature values. The feature value includes data representing a shape, size, and color of the commodity (good) and a representative image of the commodity (good). The feature value is stored in an information format suitable for a calculation of the similarity degree to be performed by the similarity calculating unit 122.

It is said that recognizing an object in an image as described above is a "generic object recognition". The "generic object recognition", including its survey, data set, and evaluation benchmark is discussed in the following paper: "The current State and Future Directions on Generic Object Recognition" by Keiji Yanai, IPSJ Journal, Vol. 48, No. SIG 16 (CVIM 19), November 2007. Information Processing Society of Japan. [Search: Mar. 6, 2015] Internet <URL: http://mm.cs.uec.au.jp./IPSJ-TCVIM-Yanai.pdf>

The technology of dividing an image into areas corresponding respectively to objects (commodities or goods) to recognize a generic object is discussed in the following paper: Jamie Shotton, "Semantec Texton Forests for Image Categorization and Segmentation", Computer Vision and Pattern Recognition, 2008, CVPR 2008. IEEE Conference on. [Search: Mar. 6, 2015] Internet <URL: http://citeseerx.ist.psu.edu/viewdoc/download?doi=10.1.1.145.3036&rep=rep1&type=pdf>

It is assumed that a method does not matter, of calculating the similarity degree between the image of the photographed commodity (good) and the commodity image (representative image) of the registered commodity in the commodity master information 100. For example, it is possible to calculate the similarity degree between the image of the photographed commodity (good) and the commodity image (representative image) of the registered commodity in the commodity master information 100 as an absolute evaluation and/or a relative evaluation.

When the similarity degree is calculated as an absolute evaluation, the feature value of the separated image and the feature value(s) of the commodity(s) stored in the commodity master information 100 are compared on the basis of 1 to 1 and the similarity degree (0 to 100%) calculated based on the comparison result is employed without any modification.

When the similarity degree is calculated as a relative evaluation, a similarity degree of each commodity is calculated such that the sum of the calculated similarity degrees of the commodities will be 1.0 (100%). For instance, assuming feature values of the commodities "A", "B", "C" and "D" are registered in the commodity master information 100, the similarity degrees of the separated images of these commodities are calculated as follows: a similarity degree of the commodity "A" is calculated to be 0.65, a similarity degree of the commodity "B" is calculated to be 0.2, a similarity degree of the commodity "C" is calculated to be 0.1, and a similarity degree of the commodity "D" is calculated to be 0.05.

Now, returning to FIG. 3, the similarity judging unit 123 will be described. The similarity judging unit 123 judges a similarity degree of the "separated image" of each commodity (good) calculated by the similarity calculating unit 122 in terms of the following conditions: for instance,
(1) one commodity (good) is uniquely specified for the "separated image";
(2) one candidate commodity (good) and more are specified for the "separated image"; and
(3) it is determined that no commodity (good) is specified for the "separated image".

For example, conditions "X" and "Y" for judgment are previously stored in the storing unit 23. When the similarity degree of a "separated image" is calculated as a relative evaluation, judgment of such similarity degree made by the similarity judging unit 123 will be described hereinafter.

When the condition "X" is satisfied, it will be determined that the above condition (1) is true, that is, one commodity (good) is uniquely specified for a "separated image". The condition "X" includes conditions as follows: "the largest similarity degree of the separated image of a commodity (good) is 90% or more"; and "a difference between the largest similarity degree of a separated image and the second largest similarity degree of other separated image is 20% or more". In other words, when the similarity degree of a separated image is 95% (largest) for the commodity (good) "A" and 60% (second largest) for the commodity (good) B, then it is determined that the condition "X" is satisfied for the commodity (good) "A" and concluded that the separated image uniquely corresponds to the commodity (good) "A".

When it is determined that the condition "X" is not satisfied, then the condition "Y" is used.

When the condition "Y" is satisfied, then it is determined that the above condition (2) is true, that is, one candidate commodity (good) and more are specified for one separated image. The condition "Y" means that one commodity (good) or more, whose similarity degree is 60% or more are specified for one separated image. In other words, assuming that for one separated image of an object, a commodity "A" has the largest similarity degree 80%, a commodity "B" has the second largest similarity degree 75%, a commodity "C" has the third largest similarity degree 65%, a commodity "D" has the fourth largest similarity degree 55%, then, the condition "Y" is satisfied. Therefore, the candidate commodities (goods) "A", "B" and "C", whose similarity degree is 60% or more are specified for the separated image of a commodity (good).

When the both conditions "X" and "Y" are not satisfied, it is determined that the above condition (3) is true, that is, no commodity (good) is specified for the separated image. The conditions "X" and "Y" are described as an example, and the conditions are not restricted to these conditions "X" and "Y". When the similarity degree of the separated image is calculated as an absolute evaluation, the conditions can be set substantially in the same manner.

The recognition-result indicating unit 130 emits light to indicate the placing position of the object (commodity) specified by the object-position detecting unit 121, and makes the light emitting device 30 emit light to indicate a recognition result confirmed by the similarity judging unit 123.

More specifically, when the similarity judging unit 123 determines that the condition (2) or (3) is true, that is, the conditions other than the condition (1) are true, and determines that a commodity cannot be uniquely specified for the separated image (hereinafter, this determination is referred to as the "recognition in error"), then, the recognition-result indicating unit 130 obtains from RAM 21 the position information (specified placing position) of such commodity (the commodity recognized in error), and makes the light emitting device 30 emit visible light toward the placing position of the commodity (recognized in error) to indicate the recognition result.

Meanwhile, when the similarity judging unit 123 determines that the condition (1) is true and a commodity can be uniquely specified for the separated image (hereinafter, the determination is referred to as the "correct recognition"), then the recognition-result indicating unit 130 obtains from RAM 21 the position information (specified placing position) of the commodity recognized correctly, and makes the light emitting device 30 emit visible light toward the placing position of the commodity (recognized correctly) to indicate the recognition result.

Figure 5:
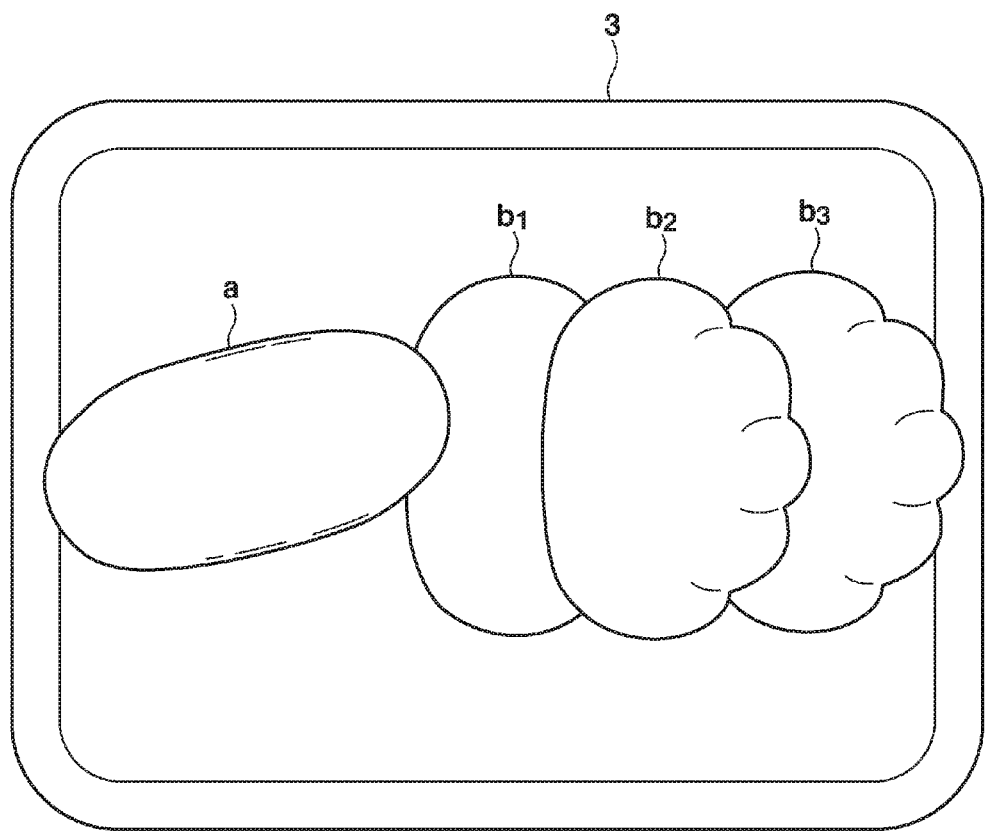
FIG. 5 is a view showing commodities put one upon another on a tray of the commodity registering apparatus (object recognizing apparatus) according to the embodiment of the invention.
Figure 6:
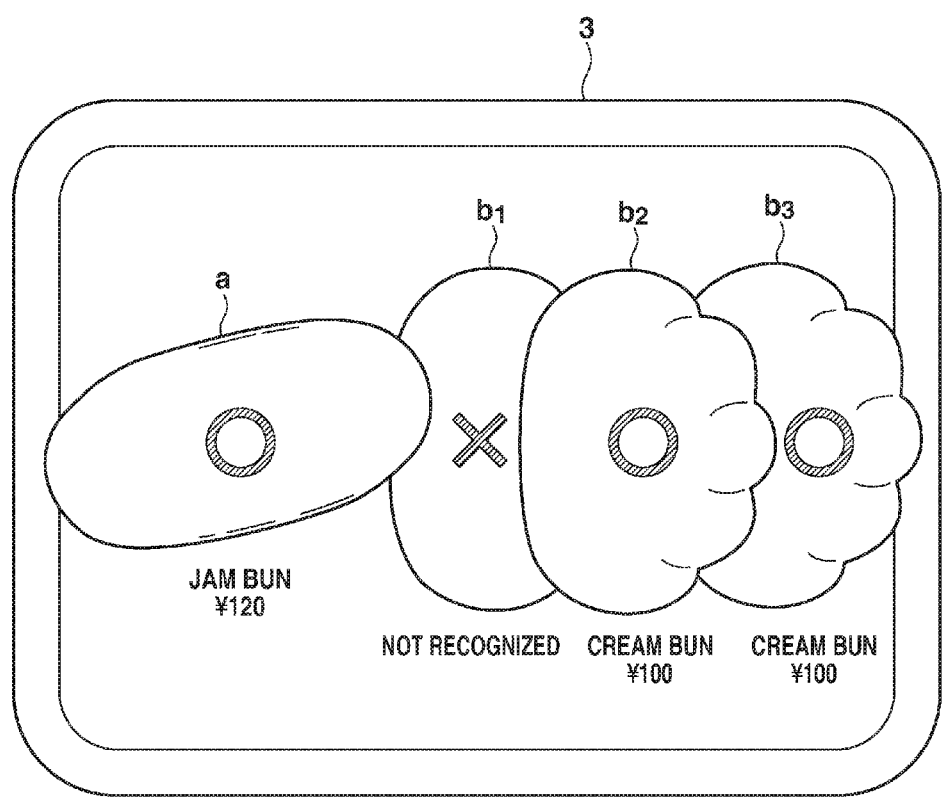
FIG. 6 is a view showing a recognition result (laser light) which is indicated on the commodities on the tray by a light emitting device under control of a recognition-result indicating unit.

FIG. 6 is a view showing the recognition results indicated respectively on the commodities on the tray 3 by the light emitting device 30 under control of the recognition-result indicating unit 130. As shown in FIG. 5, it is assumed that four objects (commodities, four buns), "a" (jam bun), "b1" (cream bun), "b2" (cream bun), "b3" (cream bun) are placed one upon another on the tray 3.

The light emitting device 30 consists of the laser projector using the galvanometer-scanner and/or optical MEMS scanner and irradiates laser light to indicate characters and/or a symbol.

Based on the recognition result confirmed by the object-recognition processing unit 120 (the similarity judging unit 123), wherein the object (object "b1") has been recognized in error, the recognition-result indicating unit 130 irradiates red laser light toward the object (object "b1") to indicate a symbol of "X" as shown in FIG. 6. Further, the recognition-result indicating unit 130 irradiates laser light to indicate a message telling "not recognized" in the vicinity of the object (object "b1") for the customer's confirmation, as shown in FIG. 6.

Meanwhile, concerning objects (objects "a", "b2" and "b3") which have been recognized correctly, the recognition-result indicating unit 130 irradiates green laser light toward these objects (objects "a", "b2" and "b3") to indicate a symbol of "O" thereon, as shown in FIG. 6. The recognition-result indicating unit 130 refers to the commodity master information 100 (FIG. 4) to read the commodity names and prices of the objects (commodities) correctly recognized, and irradiates laser light to indicate the commodity names and prices respectively in the vicinity of the objects (objects "a", "b2" and "b3") for the customer's confirmation, as shown in FIG. 6.

In short, the recognition-result indicating unit 130 makes the light emitting device 30 emit visible light toward the placing position of the object (commodity) which has been recognized in error by the object-recognition processing unit 120 to indicate prescribed character information, and also makes the light emitting device 30 emit visible light toward the placing position of the object (commodity) which has been recognized correctly by the object-recognition processing unit 120 to indicate other prescribed character information.

It is also possible for the recognition-result indicating unit 130 to make the light emitting device 30 emit light of a prescribed color toward the placing position of the object (commodity) which has been recognized in error by the object-recognition processing unit 120, and also to make the light emitting device 30 emit light of a color other than the above prescribed color toward the placing position of the object (commodity) which has been recognized correctly by the object-recognition processing unit 120.

In a modified embodiment of the invention, it is also possible to make the recognition-result indicating unit 130 irradiate laser light only toward the object (commodity) recognized in error to indicate a "recognition error" or to indicate a red colored symbol of "X" together with a message of "not recognized", and to make the recognition-result indicating unit 130 irradiate no laser light toward the object (commodity) correctly recognized. On the contrary, it is also possible to make the recognition-result indicating unit 130 irradiate laser light only toward the object (commodity) correctly recognized to indicate a green colored symbol of "O" together with the commodity name and price, and to make the recognition-result indicating unit 130 irradiate no laser light toward the object (commodity) recognized in error. In these cases, the salesclerk (operator of the commodity registering apparatus 1) and the customer are allowed to confirm at sight which commodity (good) has been recognized in error.

It is possible for the recognition-result indicating unit 130 to irradiate laser light to indicate only the "recognition error" (for example, to indicate only the symbol of "X") or to indicate only the "correct recognition" (for example, to indicate only the symbol of "O"), and without indicating the character information.

Further, in the above description, the recognition-result indicating unit 130 irradiates red laser light to indicate the "recognition error" and irradiates green laser light to indicate the "correct recognition", but it is possible for the recognition-result indicating unit 130 to irradiate other color laser light. When the recognition result is shown, for instance, by indicating the symbol "X" or "O", it is possible for the recognition-result indicating unit 130 to indicate the "recognition error" and/or the "correct recognition" by irradiating laser light of the same color.

It will be possible for the salesclerk (operator of the commodity registering apparatus 1) and the customer to specify the object (commodity) recognized in error at first sight, more quickly and for sure, when the recognition-result indicating unit 130 irradiates laser light to indicate the "recognition error" with color information and character information in addition to symbol information.

Figure 7:
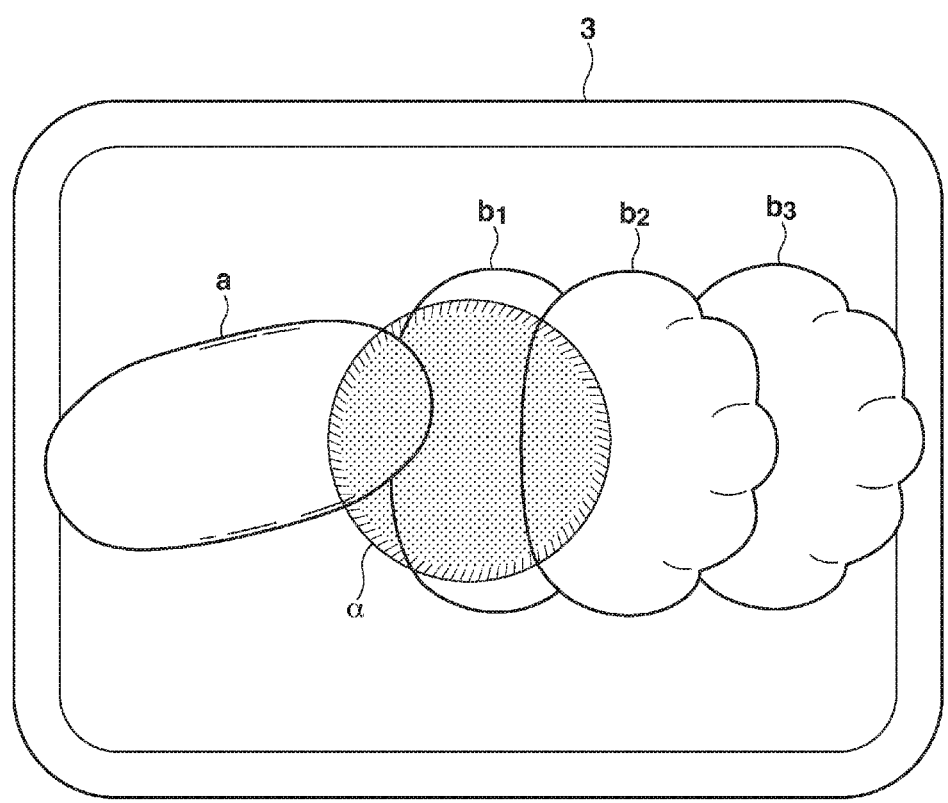
FIG. 7 is a view showing a recognition result (spotlight) which is indicated on the commodities on the tray by the light emitting device under control of the recognition-result indicating unit.

When the light emitting device 30 consists of LED light (LED spotlight) or a liquid crystal display projector having a function of emitting visible light in an arbitrary direction, the recognition-result indicating unit 130 makes the light emitting device 30 emit visible light (spotlight "a" in FIG. 7) only toward the object (commodity) recognized in error and emit no light toward the objects (commodities) correctly recognized. In other words, the recognition-result indicating unit 130 makes the light emitting device 30 emit visible light toward the placing position of the object (commodity) recognized in error by the object-recognition processing unit 120, and emit no light toward the placing positions of the objects (commodities) correctly recognized by the object-recognition processing unit 120. Also in this way, the salesclerk (operator of the commodity registering apparatus 1) and the customer can confirm which commodity (good) has been recognized in error.

In this case, it is possible for the recognition-result indicating unit 130 to irradiate red visible light (spotlight) toward the object (commodity) recognized in error and irradiate green visible light (spotlight) toward the object (commodity) correctly recognized.

Further, it is possible for the recognition-result indicating unit 130 to irradiate no light (spotlight) toward the object (commodity) recognized in error and irradiate visible light (spotlight) only toward the object (commodity) correctly recognized.

In this way, the salesclerk (operator of the commodity registering apparatus 1) and the customer can specify at first sight which commodity (good) has been recognized in error.

Returning to FIG. 3, the recognition-result displaying unit 140 will be described. The recognition-result displaying unit 140 displays on the displaying device 12A and the displaying device 11 for a customer that the similarity judging unit 123 has confirmed the condition (1) is true and a commodity (good) has been uniquely specified for the separated image of an object. The recognition-result displaying unit 140 displays the separated image of the commodity (good) recognized correctly together with a green colored frame line on the displaying device 12A and the displaying device 11 for a customer.

Meanwhile, the recognition-result displaying unit 140 displays the separated image recognized in error together with a red colored frame line on the displaying device 12A and the displaying device 11 for a customer, thereby representing that the similarity judging unit 123 has confirmed the conditions (2) and (3) are true and no commodity (good) has been uniquely specified for the separated image.

Then, the recognition-result displaying unit 140 displays a message prompting the salesclerk (operator of the commodity registering apparatus 1) to replace the commodity (good) recognized in error not to lay on other commodity (good) or to change its placed angle, and to photographs the commodity (good) again, after lapse of a prescribed time or confirming that the operator has pressed a photographing button beside the displaying device 12A, executing an object recognizing process again.

When the recognition-result indicating unit 130 irradiates visible light toward objects (commodities), and the salesclerk (operator of the commodity registering apparatus 1) and the customer confirm the commodities (goods) which have not been uniquely specified, the recognition-result displaying unit 140 reads from the commodity master information 100 the commodity names and prices of the commodities (goods) which satisfy the condition "Y", and may successively display on the displaying device 12A commodities (goods) to be specified in descending order of a similarity degree calculated by the similarity calculating unit 122.

The recognition-result displaying unit 140 displays a confirmation button on the displaying device 12A. The confirmation button is pressed by the salesclerk (operator of the commodity registering apparatus 1) to register the commodities (goods) as sales information, when the recognition-result displaying unit 140 has confirmed that all the commodities are specified.

Various enter operations are displayed on the displaying device 12A, and the enter obtaining unit 150 receives the various enter operations displayed on the displaying device 12A through the touch screen 12B. For example, when it is determined that the condition (2) is true, and one commodity (good) cannot be uniquely specified for a separated image, the enter obtaining unit 150 receives a touch operation executed on the photographing button by the operator, and when plural commodities (goods) to be specified for one separated image are displayed on the displaying device 12A, the enter obtaining unit 150 receives a touch operation of selection executed on the touch screen 12B by the operator. Further, the enter obtaining unit 150 receives the touch operation on the confirmation button for confirming the commodity (good) to be registered as the sales information.

The sales information registering unit 160 serves to register the sales information of a commodity (good) confirmed by the enter obtaining unit 150 in the commodity-sales registration information 200 of the storing unit 23. For example, in the commodity-sales registration information 200 are registered a date, commodity IDs, commodity names, prices, the number of sold commodities, and the sales amount.

The information outputting unit 170 displays the commodity manes, prices, the number of sold commodities, and the sales amount of each confirmed commodity ID on the displaying device 12A and the displaying device 11 for a customer and outputs the data to the printer 14.

[Commodity Registering Process]

The commodity registering process performed by the commodity registering apparatus 1 will be described in detail.

FIG. 8 is a flow chart of the commodity registering process (including the object recognition) performed by the commodity registering apparatus 1 according to the embodiments of the invention.

The commodity registering apparatus 1 makes the photographing device 15 keep on photographing the photographing area 151 of the photographing support 16 at all times. When the customer puts the tray 3 on the photographing support 16 and the operator touches the photographing button on the displaying device 12, the processing unit 10 of the commodity registering apparatus 1 takes in an image from the photographing device 15, starting a series of processes.

It is assumed that the light emitting device 30 consists of the projector (laser projector) using laser light, emitting laser light to indicate marks and/or characters on the commodities (goods) or on the tray 3.

The processing unit 10 starts taking in an image from the photographing device 15 (step S1 in FIG. 8). The image storing unit 110 stores in RAM 21 the frame images (photographed images) photographed by the photographing device 15.

The object-recognition processing unit 120 performs the object recognizing process on the frame image stored in RAM by the image storing unit 110.

More specifically, the object-position detecting unit 121 of the object-recognition processing unit 120 extracts contour lines (edges) from the frame image taken in by the image storing unit 110 to separate an image of a candidate commodity (object) from the background, thereby generating a separated image of the candidate commodity (object). Further, the object-position detecting unit 121 detects position information (specify a placing position) of the candidate commodity in the photographing area 151, and stores the position information in association with the detected candidate commodity (object) in RAM 21 (Refer to FIG. 2) (step S2).

The processing unit 10 repeatedly performs the processes of step S3 to step S8 on all the objects recognized by the object-position detecting unit 121 (step S3).

The similarity calculating unit 122 of the object-recognition processing unit 120 calculates a feature value, such as shape, size, color, of the object recognized image (separated image) separated by the object-position detecting unit 121, and compares the calculated feature value of the "separated image" of the candidate commodity (good) with the feature value of the commodity (good) contained in the commodity master information 100 (Refer to FIG. 4) stored in the storing in the storing unit 23, thereby calculating a similarity degree of the "separated image" of the candidate commodity (good) (step S4).

The similarity judging unit 123 of the object-recognition processing unit 120 recognizes a commodity for the object recognized image (separated image) based on the similarity degree of the separated image calculated by the similarity calculating unit 122.

The object-recognition processing unit 120 (similarity judging unit 123) judges whether the separated image has been recognized correctly or in error based on result of calculating the similarity degree (step S5). When the object-recognition processing unit 120 has recognized the separated image in error (the condition (2) or (3)), that is, the similarity judging unit 123 cannot uniquely specify a commodity for the separated image of the candidate commodity (good) (NO at step S5), the object-recognition processing unit 120 advances to step S6. Meanwhile, when the object-recognition processing unit 120 has recognized the separated image correctly (the condition (1)), that is, the similarity judging unit 123 can uniquely specify a commodity for the separated image of the candidate commodity (good) (YES at step S5), the object-recognition processing unit 120 advances to step S7.

When a commodity cannot be uniquely specified for the separated image of the candidate commodity (good) (NO at step S5), the recognition-result indicating unit 130 reads the position information of the commodity recognized in error from RAM 21 and makes the light emitting device 30 emit visible light toward the placing position of the object (commodity) to indicate the recognition result of "recognition error" (step S6). In the case illustrated in FIG. 6, the recognition-result indicating unit 130 irradiates red laser light toward the object (commodity, object "b1" in FIG. 6) recognized in error to indicate the red colored symbol of "X" together with a message of "not recognized" in the vicinity of the object (object "b1") for the customer's confirmation, as shown in FIG. 6.

Meanwhile, when a commodity can be uniquely specified for the separated image of the candidate commodity (good) (YES at step S5), the recognition-result indicating unit 130 reads the position information (specified placing position) of the commodity recognized correctly from RAM 21 and makes the light emitting device 30 emit visible light toward the placing position of the object (commodity) to indicate the recognition result of "correct recognition" (step S7). The recognition-result indicating unit 130 irradiates green laser light respectively toward the objects (commodities, objects "a", "b2", "b3" in FIG. 6) recognized correctly to indicate the green colored symbol of "O", and refers to the commodity master information 100 (FIG. 4) to read the commodity names and prices of the objects (objects "a", "b2", "b3"), and irradiates laser light to indicate the commodity names and prices respectively in the vicinity of the objects (objects "a", "b2" and "b3") for the customer's confirmation, as shown in FIG. 6.

The recognition-result indicating unit 130 judges whether the processes (at step S3 to step 8) have been repeatedly executed on all the object recognized images (separated images) obtained by the object-recognition processing unit 120 (step S8). When it is determined that the processes (at step S3 to step 8) have not been repeatedly executed on all the object recognized images (separated images), the recognition-result indicating unit 130 returns to step S3. When it is determined that the processes (at step S3 to step 8) have been repeatedly executed on all the object recognized images (separated images), the recognition-result indicating unit 130 advances to step S9.

When the processes (at step S3 to step 8) have been repeatedly executed on all the object recognized images (separated images), the salesclerk (operator of the commodity registering apparatus 1) and the customer will be able to confirm which commodity (good) on the tray 3 has been recognized in error.

The recognition-result displaying unit 140 displays the recognition result confirmed by the similarity judging unit 123 on the displaying device 12A and the displaying device 11 for a customer (step S9). More specifically, the recognition-result displaying unit 140 displays the separated image recognized correctly, for example, together with the green colored frame line on the displaying device 12A and the displaying device 11 for a customer. Meanwhile, the recognition-result displaying unit 140 displays the separated image recognized in error, for example, together with the red colored frame line on the displaying device 12A and the displaying device 11 for a customer.

The recognition-result displaying unit 140 judges whether the enter obtaining unit 150 has received information of telling that the operator pressed the photographing button provided on the displaying device 12A (step S10). When the salesclerk (operator of the commodity registering apparatus 1) has replaced the commodity (good) recognized in error not to lay on other commodity (good) or to change its placed angle, the operator will press the photographing button to photograph the commodity (good) again.

Upon receipt of information of telling that the photographing button has been pressed (YES at step S10), the recognition-result displaying unit 140 returns to step S1. Receiving no information of telling that the photographing button has been pressed (NO at step S10), the recognition-result displaying unit 140 advances to step S11.

The recognition-result displaying unit 140 judges whether the enter obtaining unit 150 has received information of telling that the operator pressed the confirmation button provided on the displaying device 12A (step S11). When all the candidate commodities (goods) recognized in error are photographed again, and all the commodities (goods) are uniquely specified for such candidate commodities (goods), the operator presses the confirmation button. Also, when the recognition-result displaying unit 140 displays a selection screen of a commodity of a high similarity degree for operator's selection and all the commodities (goods) are uniquely specified for such candidate commodities (goods), the confirmation button is pressed.

When the operator presses the confirmation button, the recognition-result displaying unit 140 advances to a registering process of sales information.

Receiving the information of telling that the confirmation button has been pressed (YES at step S11), the recognition-result displaying unit 140 advances to step S12. Meanwhile, when no information of telling that the confirmation button has been pressed is received within a prescribed period of time (NO at step S11), the recognition-result displaying unit 140 returns to step S1.

The sales information registering unit 160 registers the sales information (a date, commodity IDs, commodity names, prices, the number of sold commodities, and the sales amount) of commodities (goods) confirmed by the enter obtaining unit 150 in the commodity-sales registration information 200 of the storing unit 23, and then finishes the commodity registering process.

As described above, in the commodity registering apparatus (object recognizing apparatus) 1 and the method of indicating a recognition result according to the embodiments of the present invention, an object (commodity) is recognized based on the image information obtained by the photographing device 15, and the placing position of the object (commodity) is specified. The light emitting device 30 emits light toward the specified placing position to indicate the recognition result. In this way, the commodity registering apparatus 1 can clearly indicate which object (commodity) is one recognized in error. As a result, the salesclerk (operator of the commodity registering apparatus 1) can confirm at sight which commodity has been recognized in error or correctly, and can replace the commodity recognized in error to other place or change its placing angle, increasing working efficiency.

If the commodity registering apparatus 1 uses laser light to indicate the commodity name and price of the commodity recognized in error, the displaying device 11 for a customer will be omitted.

Although specific embodiments of the invention have been described in the foregoing detailed description, it will be understood that the invention is not limited to the particular embodiments described herein, but modifications and rearrangements may be made to the disclosed embodiments while remaining within the scope of the invention as defined by the following claims. It is intended to include all such modifications and rearrangements in the following claims and their equivalents.

(a) In the above description of the commodity registering apparatus (object recognizing apparatus) 1 according to the embodiments of the invention, the light emitting device 30 provided above the tray 3 emits visible light from above, as shown in FIG. 1.

It is possible to accommodate the light emitting device 30 within the photographing support 16 and to make the light emitting device 30 emit visible light (spotlight) from beneath toward the tray 3. The tray is made of a semi-transparent material which allows the light to pass through, and when the light emitting device 30 emits spotlight to the placing position of the object (commodity) recognized in error, the salesclerk (operator of the commodity registering apparatus 1) and the customer are allowed to specify the object (commodity) easily.

When commodity which is not required to be placed on the tray 3, such as vegetables and fruits, is subjected to "object recognition", it is possible to dispose an LED displaying device and/or a liquid crystal displaying device in the photographing support 16 and to display a screen for specifying an object (commodity) recognized in error on the displaying device. In this way, the salesclerk (operator of the commodity registering apparatus 1) and the customer can specify the commodity (good) recognized in error.

(b) In the commodity registering apparatus (object recognizing apparatus) 1 according to the embodiments of the invention, the case where one commodity has been recognized in error has been explained in the above description. When plural commodities recognized in error are irradiated simultaneously or when plural commodities recognized in error and correctly are irradiated simultaneously, it is possible for the light emitting device 30 irradiates laser light toward the commodities one by one or to provide plural light emitting devices (laser projectors) irradiating different color laser light towards plural commodities, respectively.

What is claimed is:

1. An object recognizing apparatus comprising:
a storing unit which stores feature values of objects in each classification of plural objects, wherein the feature value is used as a reference for specifying the classification of an object;
an object recognizing unit which photographs a plurality of objects placed within a prescribed area with a photographing device to specify placing positions where the objects are placed from an image of the photographed objects, and refers to the feature values stored in the storing unit to recognize the classification of each of the photographed objects; and
a recognition result indicating unit which controls a light emitting device to emit light based on whether or not the object recognizing unit has recognized the classification of each of the objects photographed by the photographing device,
wherein the recognition result indicating unit controls the light emitting device to emit visible light onto the specified placing position of only at least one object which is not recognized among the plurality of objects, when the object recognizing unit has not recognized the classification of the at least one photographed object, and controls the light emitting device to emit no visible light onto the specified placing position of a remaining at least one object which has been recognized among the plurality of objects, when the object recognizing unit has recognized the classification of the remaining at least one photographed object.

2. An object recognizing apparatus comprising:
a storing unit which stores feature values of objects in each classification of plural objects, wherein the feature value is used as a reference for specifying the classification of an object;
an object recognizing unit which photographs a plurality of objects placed within a prescribed area with a photographing device to specify placing positions where the objects are placed from an image of the photographed objects, and refers to the feature values stored in the storing unit to recognize the classification of each of the photographed objects; and
a recognition result indicating unit which controls a light emitting device to emit light based on whether or not the object recognizing unit has recognized the classification of each of the objects photographed by the photographing device, wherein the recognition result indicating unit controls the light emitting device to emit light of a first color onto the specified placing position of only at least one object which is not recognized among the plurality of objects, when the object recognizing unit has not recognized the classification of the at least one photographed object, and controls the light emitting device to emit light of a second color different from the first color onto the specified placing position of a remaining at least one object which has been recognized among the plurality of objects, when the object recognizing unit has recognized the classification of the remaining at least one photographed object.

3. An object recognizing apparatus comprising:

a storing unit which stores feature values of objects in each classification of plural objects, wherein the feature value is used as a reference for specifying the classification of an object;

an object recognizing unit which photographs an object a plurality of objects placed within a prescribed area with a photographing device to specify placing positions where the objects are placed from an image of the photographed objects, and refers to the feature values stored in the storing unit to recognize the classification of each of the photographed objects; and a recognition result indicating unit which controls a light emitting device to emit light based on whether or not the object recognizing unit has recognized the classification of each of the objects photographed by the photographing device, wherein the recognition result indicating unit controls the light emitting device to emit visible light onto the specified placing position of only at least one object which is not recognized among the plurality of objects, to display first character information on the at least one object, when the object recognizing unit has not recognized the classification of the at least one photographed object, and controls the light emitting device to emit visible light onto the specified placing position of a remaining at least one object which has been recognized among the plurality of objects, to display second character information different from the first character information, when the object recognizing unit has recognized the classification of the remaining at least one photographed object.

4. A method of indicating a recognition result, the method comprising:

a storing step of storing feature values of objects in each classification of plural objects in a storing unit, wherein the feature value is used as a reference for specifying the classification of an object;

an object recognizing step of photographing a plurality of objects placed within a prescribed area with a photographing device to specify placing positions where the objects are placed from an image of the photographed objects, and referring to the feature values stored in the storing unit to recognize the classification of each of the photographed objects; and a recognition result indicating step of controlling a light emitting device to emit light based on whether or not the classification of each of the objects photographed by the photographing device has been recognized at the object recognizing step, wherein the recognition result indicating step comprises a step of controlling the light emitting device to emit visible light onto the specified placing position of only at least one object which is not recognized among the plurality of objects, when the classification of the at least one photographed object has not been recognized at the object recognizing step, and controlling the light emitting device to emit no visible light onto the specified placing position of a remaining at least one object which has been recognized among the plurality of objects, when the classification of the remaining at least one photographed object has been recognized at the object recognizing step.

5. A method of indicating a recognition result, the method comprising:

a storing step of storing feature values of objects in each classification of plural objects in a storing unit, wherein the feature value is used as a reference for specifying the classification of an object;

an object recognizing step of photographing a plurality of objects placed within a prescribed area with a photographing device to specify placing positions where the objects are placed from an image of the photographed objects, and referring to the feature values stored in the storing unit to recognize the classification of each of the photographed objects; and a recognition result indicating step of controlling a light emitting device to emit light based on whether or not the classification of each of the objects photographed by the photographing device has been recognized at the object recognizing step, wherein the recognition result indicating step comprises a step of controlling the light emitting device to emit light of a first color onto the specified placing position of only at least one object which is not recognized among the plurality of objects, when the classification of the at least one photographed object has not been recognized at the object recognizing step, and controlling the light emitting device to emit light of a second color different from the first color onto the specified placing position of a remaining at least one object which has been recognized among the plurality of objects, when the classification of the remaining at least one photographed object has been recognized at the object recognizing step.

6. A method of indicating a recognition result, the method comprising:

a storing step of storing feature values of objects in each classification of plural objects in a storing unit, wherein the feature value is used as a reference for specifying the classification of an object;

an object recognizing step of photographing a plurality of objects placed within a prescribed area with a photographing device to specify placing positions where the objects are placed from an image of the photographed objects, and referring to the feature values stored in the storing unit to recognize the classification of each of the photographed objects; and a recognition result indicating step of controlling a light emitting device to emit light based on whether or not the classification of each of the objects photographed by the photographing device has been recognized at the object recognizing step, wherein the recognition result indicating step comprises a step of controlling the light emitting device to emit visible light onto the specified placing position of only at least one object which is not recognized among the plurality of objects, to display first character information on the at least one object, when the classification of the at least one photographed object has not been recognized at the object recognizing step, and controlling the light emitting device to emit visible light onto the specified placing position of a remaining at least one object which has been recognized among the plurality of objects, to display second character information different from the first character information, when the classification of the remaining at least one photographed object has been recognized at the object recognizing step.

7. A non-transitory computer-readable recording medium with an executable program stored thereon which, when executed by a computer mounted on an object recognizing apparatus, controls the computer to execute processes comprising:

a storing process of storing feature values of objects in each classification of plural objects in a storing unit, wherein the feature value is used as a reference for specifying the classification of an object;

an object recognizing process of photographing a plurality of objects placed within a prescribed area with a photographing device to specify placing positions where the objects are placed from an image of the photographed objects, and referring to the stored feature values to recognize the classification of each of the photographed objects; and a recognition result indicating process of controlling a light emitting device to emit light based on whether or not the classification of each of the objects photographed by the photographing device has been recognized in the object recognizing process, wherein the recognition result indicating process comprises controlling the light emitting device to emit visible light onto the specified placing position of only at least one object which is not recognized among the plurality of objects, when the classification of the at least one photographed object has not been recognized in the object recognizing process, and controlling the light emitting device to emit no visible light onto the specified placing position of a remaining at least one object which has been recognized among the plurality of objects, when the classification of the remaining at least one photographed object has been recognized in the object recognizing process.

8. A non-transitory computer-readable recording medium with an executable program stored thereon which, when executed by a computer mounted on an object recognizing apparatus, controls the computer to execute processes comprising:

a storing process of storing feature values of objects in each classification of plural objects in a storing unit, wherein the feature value is used as a reference for specifying the classification of an object;

an object recognizing process of photographing a plurality of objects placed within a prescribed area with a photographing device to specify placing positions where the objects are placed from an image of the photographed objects, and referring to the stored feature values to recognize the classification of each of the photographed objects; and a recognition result indicating process of controlling a light emitting device to emit light based on whether or not the classification of each of the objects photographed by the photographing device has been recognized in the object recognizing process, wherein the recognition result indicating process comprises controlling the light emitting device to emit light of a first color onto the specified placing position of only at least one object which is not recognized among the plurality of objects, when the classification of the at least one photographed object has not been recognized in the object recognizing process, and controlling the light emitting device to emit light of a second color different from the first color onto the specified placing position of a remaining at least one object which has been recognized among the plurality of objects, when the classification of the remaining at least one photographed object has been recognized in the object recognizing process.

9. A non-transitory computer-readable recording medium with an executable program stored thereon which, when executed by a computer mounted on an object recognizing apparatus, controls the computer to execute processes comprising:

a storing process of storing feature values of objects in each classification of plural objects in a storing unit, wherein the feature value is used as a reference for specifying the classification of an object;

an object recognizing process of photographing a plurality of objects placed within a prescribed area with a photographing device to specify placing positions where the objects are placed from an image of the photographed objects, and referring to the stored feature values to recognize the classification of each of the photographed objects; and a recognition result indicating process of controlling a light emitting device to emit light based on whether or not the classification of each of the objects photographed by the photographing device has been recognized in the object recognizing process, wherein the recognition result indicating process comprises controlling the light emitting device to emit visible light onto the specified placing position of only at least one object which is not recognized among the plurality of objects, to display first character information on the at least one object, when the classification of the at least one photographed object has not been recognized in the object recognizing process, and controls the light emitting device to emit visible light onto the specified placing position of a remaining at least one object which has been recognized among the plurality of objects, to display second character information different from the first character information, when the classification of the remaining at least one photographed object has been recognized in the object recognizing process.

* * * * *

UNITED STATES PATENT AND TRADEMARK OFFICE
CERTIFICATE OF CORRECTION

PATENT NO.         : 9,978,050 B2
APPLICATION NO.    : 15/055716
DATED              : May 22, 2018
INVENTOR(S)        : Kenichiro Matsuzaki Page 1 of 1

It is certified that error appears in the above-identified patent and that said Letters Patent is hereby corrected as shown below:

In the Claims

Column 17, Line 23, Claim 3, after "photographs" delete "an object".

Signed and Sealed this
Twenty-eighth Day of August, 2018

Andrei Iancu
*Director of the United States Patent and Trademark Office*